US011049177B2

(12) United States Patent
White et al.

(10) Patent No.: US 11,049,177 B2
(45) Date of Patent: Jun. 29, 2021

(54) MULTI-LOCATION TOOL SENSING SYSTEM (71) Applicant: Stanley Industrial & Automotive, LLC, Westerville, OH (US)

(72) Inventors: Christopher White, Kennesaw, GA (US); James Michael Ratteree, Cartersville, GA (US); Wan-Chun Liao, Kennesaw, GA (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 0 days.

(21) Appl. No.: 16/337,510

(22) PCT Filed: Jul. 24, 2017

(86) PCT No.: PCT/US2017/043468
§ 371 (c)(1),
(2) Date: Mar. 28, 2019

(87) PCT Pub. No.: WO2018/063476
PCT Pub. Date: Apr. 5, 2018

(65) Prior Publication Data
US 2019/0279288 A1    Sep. 12, 2019

Related U.S. Application Data (60) Provisional application No. 62/401,442, filed on Sep. 29, 2016.

(51) Int. Cl.
*G06Q 30/06*    (2012.01)
*G07C 3/02*    (2006.01)
(Continued)

(52) U.S. Cl.
CPC ..... *G06Q 30/0645* (2013.01); *G06Q 10/0833* (2013.01); *G07C 3/00* (2013.01); *G07C 3/02* (2013.01); *G07C 3/08* (2013.01)

(58) Field of Classification Search
CPC .. G06Q 30/0645; G06Q 10/0833; G07C 3/00; G07C 3/02; G07C 3/08
See application file for complete search history.

(56) References Cited

U.S. PATENT DOCUMENTS 7,859,417 B2   12/2010  Harper et al.
8,159,345 B2    4/2012  Stevens
(Continued)

FOREIGN PATENT DOCUMENTS

EP    1808275 A2    7/2007

OTHER PUBLICATIONS

International Search Report dated Oct. 13, 2017.
Extended European search report for EP Application No. 17856954.7 dated May 12, 2020.

*Primary Examiner* — Amine Benlagsir
(74) *Attorney, Agent, or Firm* — Thomas | Horstemeyer, LLP (57) ABSTRACT Systems and apparatus for tracking tools are disclosed. In one embodiment, among others, an apparatus has a tool cabinet with at least one bin. A computing device is associated with the tool cabinet. A sensor network layer is positioned in the at least one bin. The sensor network is coupled with the computing device. The sensor network layer is configured to detect a presence and an absence of a tool item at a predetermined location. The sensor network is configured to transmit a signal to the computing device indicative of the presence or the absence of the tool item at the predetermined location. A covering positioned over the sensor network layer. The covering is configured to facilitate a placement of the tool item at the predetermined location.

20 Claims, 9 Drawing Sheets (51) Int. Cl.
  *G07C 3/00* (2006.01)
  *G06Q 10/08* (2012.01)
  *G07C 3/08* (2006.01)

(56) References Cited

U.S. PATENT DOCUMENTS

| | | | |
|---|---|---|---|
| 8,395,496 B2 | 3/2013 | Joshi et al. | |
| 2007/0118897 A1* | 5/2007 | Munyon | G06F 21/35 726/22 |
| 2008/0088454 A1* | 4/2008 | Flores | G06Q 10/087 340/572.4 |
| 2008/0169910 A1 | 7/2008 | Greene et al. | |
| 2009/0072029 A1* | 3/2009 | Martin | G06Q 10/087 235/385 |
| 2010/0252626 A1 | 10/2010 | Elizondo et al. | |
| 2010/0271010 A1 | 10/2010 | Stevens et al. | |
| 2011/0025503 A1* | 2/2011 | Weaver | G08B 21/24 340/572.1 |
| 2012/0200385 A1* | 8/2012 | Savage | G07F 11/62 340/5.7 |
| 2013/0250117 A1* | 9/2013 | Pixley | H04N 7/181 348/156 |
| 2013/0346261 A1* | 12/2013 | Phillips | G07C 9/22 705/28 |
| 2014/0039351 A1 | 2/2014 | Mix et al. | |
| 2015/0041616 A1* | 2/2015 | Gentile | G06Q 10/087 248/550 |
| 2016/0171903 A1* | 6/2016 | Grossman | B25H 3/00 434/238 |
| 2016/0232387 A1 | 8/2016 | Myers et al. | |

\* cited by examiner

MULTI-LOCATION TOOL SENSING SYSTEM

CLAIM OF PRIORITY

This application is the 35 U.S.C. § 371 national stage application of PCT Application No PCT/US2017/043468, filed Jul. 24, 2017, where the PCT claims priority to and benefit of U.S. application No. 62/401,442, filed Sep. 29, 2016, both of which are herein incorporated by reference in their entireties.

BACKGROUND

Tools can vary in size and shape. Typically, tools are stored in a drawer in a tool cabinet. At a facility, various people may share a set of tools. As such, various tools may be removed and returned from the drawer at different times. Apparatus and methods are needed for tracking removal and return of tools.

SUMMARY OF INVENTION

The present disclosure provides various embodiments of tool tracking apparatus, systems, and methods.

One embodiment, among others, is an apparatus having a tool cabinet with at least one bin. A computing device is associated with the tool cabinet. A sensor network layer is positioned in the at least one bin. The sensor network is coupled with the computing device. The sensor network layer is configured to detect a presence and an absence of a tool item at a predetermined location. The sensor network is configured to transmit a signal to the computing device indicative of the presence or the absence of the tool item at the predetermined location. A covering positioned over the sensor network layer. The covering is configured to facilitate a placement of the tool item at the predetermined location.

Another embodiment, among others, is a tool tracking system. The system has a bin. A computing device is associated with the bin. A sensor layer is positioned in the bin. The sensor layer is coupled with the computing device. The sensor layer is configured to detect a presence and an absence of a tool item at a location. The sensor layer is configured to transmit a signal to the computing device indicative of the presence or the absence of the tool item at the location. A liner layer is positioned over the sensor layer. The liner layer is configured to facilitate a placement of the tool item at the location.

Another embodiment, among others, is a system having a tool drawer. A computing device is associated with the tool drawer. A covering layer is positioned in the tool drawer. The covering layer is configured to facilitate a placement of a tool item at a location. A sensor network layer is integrated within the covering layer. The sensor network layer is coupled with the computing device. The sensor network layer is configured to detect a presence of the tool item at the location. The sensor network is configured to transmit a signal to the computing device in response to the detection of the presence of the tool item at the location.

Other embodiments, methods, apparatus, features, and advantages of the present invention will be or become apparent to one with skill in the art upon examination of the following drawings and detailed description. It is intended that all such additional embodiments, methods, apparatus, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

The drawings illustrate only exemplary embodiments and are therefore not to be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar references numerals between figures designates like or corresponding, but not necessarily identical, elements.

DETAIL DESCRIPTION

Typically, a tool drawer is used to store tools of varying sizes and shapes. Oftentimes, small tools or tools with atypical dimensions can be difficult to track. Specifically, tracking small and unusual shaped tools can be problematic because it can be difficult to affix a tracking apparatus to these tools. For instance, tracking drill bits, wrench sockets, a ratcheting screwdriver and the associated bit heads, pliers, and other suitable tools can be difficult to track in a drawer because these tools have small or unusual shapes. In that context, the present disclosure relates to tracking one or more tools of various sizes and shapes within a container.

For example, in one embodiment, among others, the present disclosure relates to a tool tracking system that includes a tool cabinet with multiple drawers. Each drawer can include a cut-out layer, a covering layer, and a sensor network layer. The sensor network layer can be positioned below the cut-out layer and the covering layer. The sensor network layer can track the presence or absence of small or unusually shaped tool items at particular locations within the drawer. In this example, tools can be placed at locations in the drawer according to cut-outs in the cut-out layer. In another embodiment, among others, the present disclosure relates to a flexible drawer mat that has an integrated sensor network layer. Thus, the mat can be placed in an existing drawer and provide tracking functionality for tools that are placed over the mat in the drawer. For instance, the mat can have color indicators or raised protrusions in the mat to indicate the appropriate location for a particular tool. The sensor network layer comprises a grid of sensors to detect the presence or absence of tools at individual grid locations. In other embodiments, among others, the sensor grid can group adjacent grid sensors to collectively detect tools that occupy more than one grid location.

The present disclosure of the various embodiments has several advantages over existing storage solutions. For instance, the various embodiments of the present disclosure enable automated tracking of tool items that have previously been difficult to track, such as drill bit, wrench sockets, and other unusually shaped tool items. In addition, the embodiments can add tracking functionality to existing drawers, shelfs, and tool cabinets because of the portability of the embodiments. For example, in some embodiments, among others, the tool tracking system can be battery powered and include a wireless interface for transmitting tool tracking data. In addition, the tool tracking system can save time typically used for tracking an inventory of tools. Instead, the present disclosure can provide reporting statistics such as tool checked-in actions, tool checked-out actions, and a user account associated with each of the actions.

In the following paragraphs, the embodiments are described in further detail by way of example with reference to the attached drawings. In the description, well known components, methods, and/or processing techniques are omitted or briefly described so as not to obscure the embodiments. Turning now to the drawings, a general description of exemplary embodiments of a multi-location tool sensing system and its components are provided, followed by a discussion of the operation of the system.

Figure 1A:
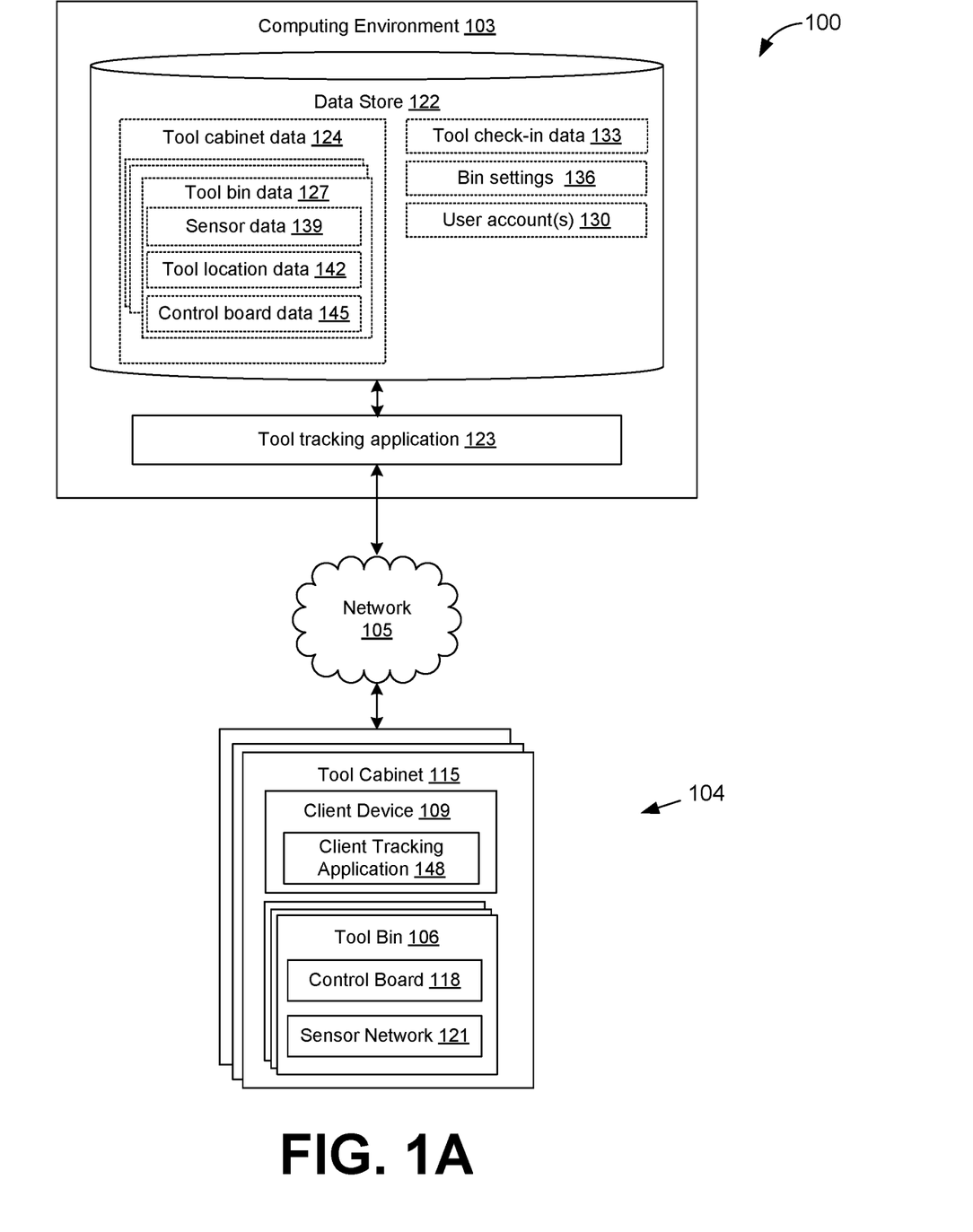
FIG. 1A illustrates a networked environment according to various embodiments of the present disclosure.

With reference to FIG. 1A, shown is a networked environment 100 according to various embodiments. The networked environment 100 includes a computing environment 103 and one or multiple tool tracking systems 104, which are in data communication with each other via a network 105. The tool tracking system 104 may include one or multiple tool tracking bins 106 (also referred as a "tool bin 106") and a client device 109, which can be in data communication with each other via the network 105, a local network, a wired connection, and other suitable communication mechanisms. The client device 109 can be associated with one or more tool cabinets 115. Each tool cabinet 115 can include one or more tool tracking bins 106. Each tool bin 106 can include a control board 118 and a sensor network layer 121, which can be electrically or mechanically coupled to each other.

The tool bin 106 can represent a drawer, a storage bin, a shelf, or other suitable storage locations. The tool bin 106 can include the control board 118 and the sensor network layer 121. In some embodiments, among others, the control board 118 may be omitted in the tool bin 106. In this example, a single control board 118 can be attached to a tool cabinet and in communication with multiple sensor network layers 121 that are located in the tool cabinet 115.

The control board 118 can be electrically or mechanically coupled to the sensor network layer 121. The control board 118 can comprise of various components for receiving sensor data from the sensor network layer 121, for processing the sensor data, and for transmitting the sensor data. For example, the control board 118 may include a processor, analog-to-digital converters, a communications transceiver, a battery, a battery charging circuit, and other suitable components.

The sensor network layer 121 can comprise a plurality of sensors. The sensors can be used to detect the presence or the absence of tool items at a particular location in the tool bin 106. The sensors can include various combinations of metal sensors, weight sensors, proximity sensors, motion sensors, inductive sensors, optical sensors, mechanical switches, dome-switches, and other suitable sensing devices. Proximity sensors include, for example, capacitive sensors, inductive sensors, and other suitable sensors. The optical sensors can require that devoted lighting be used to pair with the optical sensors that have a specific spectrum of wavelength so that the sensor network layer can be used in any type of lighting environment. The dome-switches can be compressed by the weight of the tool item to complete a circuit in the sensor network layer 121. With respect to inductive sensors, reluctance can change when a ferrous target enters a sensing zone. With regard to capacitance sensors, the capacitance increases when ferrous/nonferrous target enters the sensing zone.

In some embodiments, among others, the sensor network layer 121 can be positioned underneath a covering layer. The covering layer can be a pad, a mat, or some other material layer to cover the sensor network layer 121. The covering layer can comprise a flexible or rigid material, such as rubber, plastic, and other suitable materials. In some embodiments, among others, the sensor network layer 121 can be integrated within the covering layer. The covering layer can be used to facilitate a placement of the tool items at specific locations. For example, the covering layer may include raised protrusions or specific colors to indicate the location of a particular tool item on the covering layer.

The network 105 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 122 that is accessible to the computing environment 103. The data store 122 may be representative of a plurality of data stores 122 as can be appreciated. The data stored in the data store 122, for example, is associated with the operation of the various applications and/or functional entities described below.

The components executed on the computing environment 103, for example, tool tracking application 123, and other applications, services, processes, systems, engines, or functionality not discussed in detail herein. The tool tracking application 123 can be executed to manage the status of a plurality of tool items and a location associated with each of the tool items.

The data stored in the data store 122 includes, for example, tool cabinet data 124, tool bin data 127, user accounts 130, tool check-in data 133, bin setting 136, and potentially other data. The tool cabinet data 124 can include data related to each tool cabinet 115, such as the client device 109 associated with a respective tool cabinet 115, the tool bins 106 located in the respective tool cabinet, and a location of the tool cabinet 115 in a facility. The tool bin data 106 can include data related to a particular tool bin 106, such as sensor data 139 associate with a plurality of sensors of the sensor network layer 121. The sensor data 139 can include data related to sensor measurements received from the sensor network layer 121. The tool bin data 106 also includes tool location data 142 and control board data 145. The tool location data 142 can relate to tracking the location of tools in the particular tool bin 106. For example, the sensor network layer 121 can comprise of multiple sensors in a grid arrangement. The tool location data 142 may comprise an X axis and Y axis coordinate location indicating a location of a particular tool item in the tool bin 106. In other non-limiting examples, the sensors may be positioned in other non-grid arrangements. In this scenario, the location of each of the sensors may be predetermined and stored in the data store. The control board data 145 can include data related to various components on the control board 118. For example, the control board data 145 can include data related to battery levels, diagnostic data, control board addresses, sensor network grids, and other suitable data.

The user accounts data 130 can relate to data associated with a plurality of user accounts. Each user account can be associated with an individual or a group of individuals. The user account data 130 can include profile information such as name, address, department, position, and other suitable profile information.

The tool check-in data 133 can relate to check-in events and check-out events for each of the tool items. These check-in and check-out events can include information such as a time stamp associated with the occurrence of these events and an associated user account 130. The bin settings 136 can relate to various settings associated with components in and associated with the tool bin 106. For example, the bin settings 136 can include settings associated with the sensors in the sensor network 121, such as sensor sensitivity.

The client device 109 is representative of a plurality of client devices that may be coupled to the network 105. The client device 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 109 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 109 may be configured to execute various applications such as a client tracking application 148 and/or other applications. The client tracking application 148 may be executed in the client device 109, for example, to track the location tool items in the tool bins 106. Further, the client tracking application 148 can be configured to group adjacent sensors together as a unit to correspond to a shape of a tool item. The client tracking application 148 may also be configured to access network content served up by the computing environment 103 and/or other servers, thereby rendering a user interface on the display. To this end, the client tracking application 148 may comprise, for example, a browser, a dedicated application, etc., and the user interface may comprise a network page, an application screen, etc. The client device 109 may be configured to execute applications beyond the client tracking application 148 such as, for example, email applications, social networking applications, word processors, spreadsheets, and/or other applications.

Figure 1B:
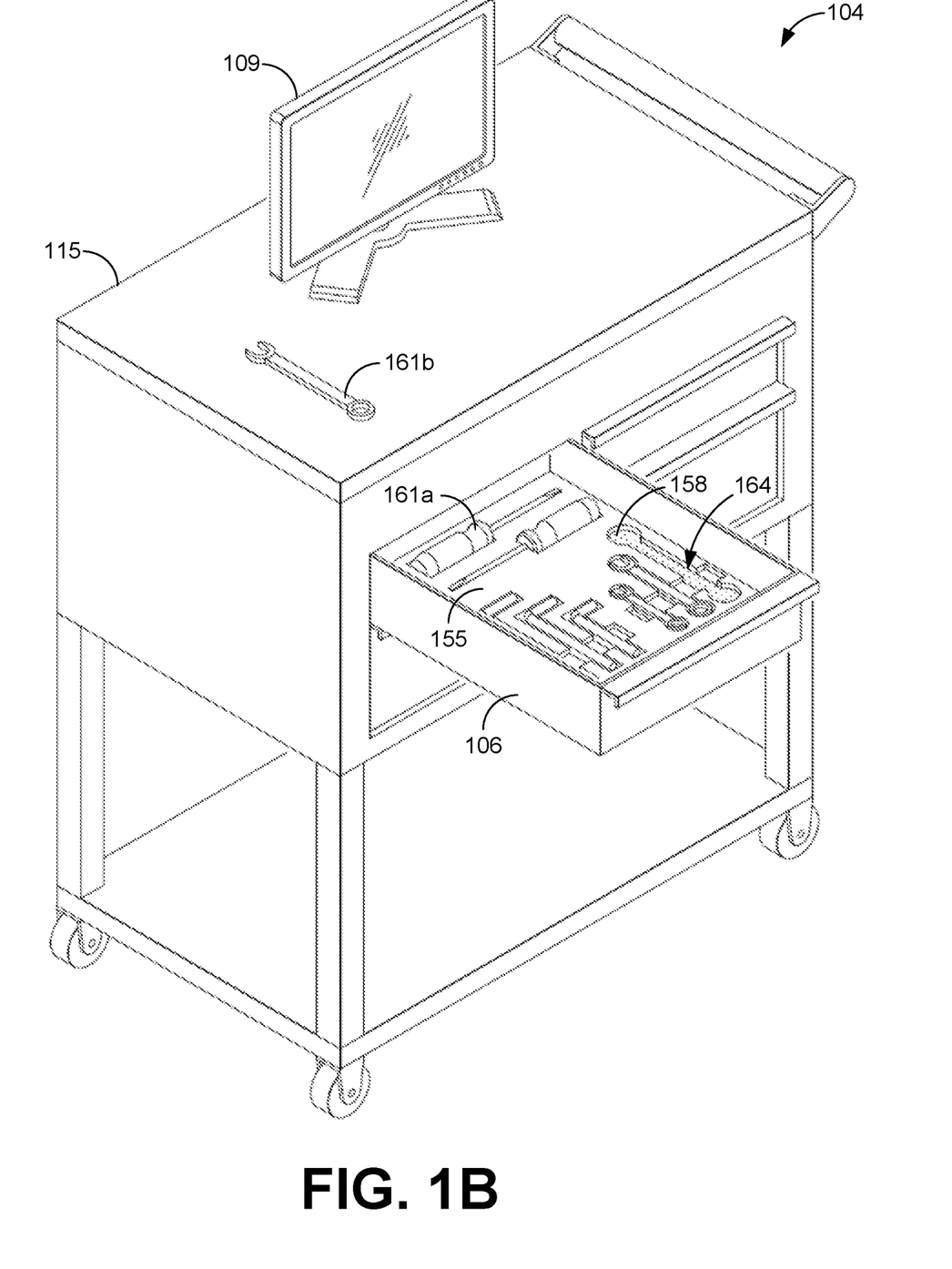
FIG. 1B is a drawing of a perspective view of a tool cabinet with tracking tool bins according to various embodiments of the present disclosure.

Turning now to FIG. 1B, shown is a perspective view of one exemplary embodiment of the tool tracking system 104, which includes the tool cabinet 115 with multiple tool bins 106, and the client device 109. In the illustrated embodiment, one of the tool bins 106 has been pulled out and one of the tool items have been removed from the tool bin 106. FIG. 1B also illustrates a cut-out layer 155 and a covering layer 158. In this illustrated embodiment, among others, the covering layer 158 is positioned below the cut-out layer 155. The cut-out layer 155 can be comprised of foam, plastic, rubber, and other suitable materials. In this embodiment, among others, the sensor network layer 121 can be below the covering layer 158 or integrated within the covering layer 158.

Figure 2:
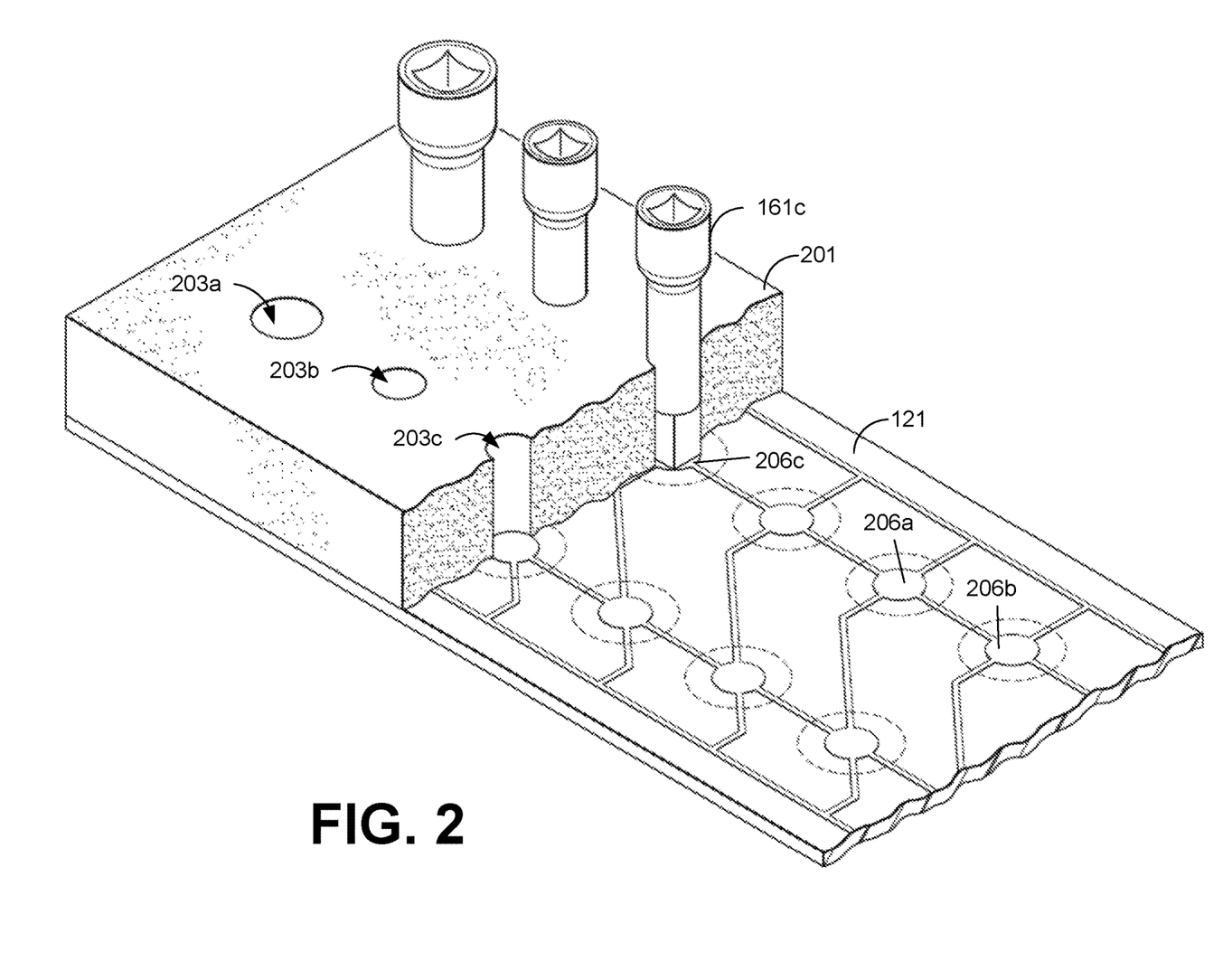
FIG. 2 is a drawing of a perspective cross sectional view of a cut-out layer and a sensor network layer according to various embodiments of the present disclosure.

Referring between FIGS. 1A and 1B, a general description of the operation of the various components of the networked environment 100 is provided. To begin, multiple tool bins 106 can be placed in the tool cabinet 115. Each tool bin 106 can have numerous tool items 161 (collectively "tool items 161") stored inside. For instance, the tool bin 106 may contain hundreds of individual tool items 161. Each of these tool items 161 can be stored at a specific location in the tool bin 106. While the tool items 161 are in the tool bin 106, the sensor network layer 121 can detect the presence of the tool items 161 at their respective locations. In some embodiments, among others, the sensors in the sensor network layer 121 can detect a particular tool item 161 from the contact the particular tool item 161 makes with the covering layer 158. In other embodiment, among others, the covering layer 158 and/or the cut-out layer 155 may be omitted and the tool item 161 can make direct contact with the sensors in the sensor network layer 121 (FIG. 2). As one skilled in the art can appreciate, the tool items 161 can be detected in various ways according to the operations of the sensors.

The sensor network layer 121 can transmit to the control board 118 electrical or mechanical signals associated with the presence or absence of tool items 161. As one non-limiting example, a person looking for a specific tool can login into the client device 109 with their user account 136 and open the tool bin 106. The person can pick up a tool item 161b (i.e. wrench tool), as illustrated in FIG. 1B. One or multiple sensors associated with a vacant tool location 164 in the tool bin 106 can transmit a signal to the control board 118 indicative of a tool absence at the vacant tool location 164. The control board 118, in turn, can transmit the tool absence at the vacant tool location 164 to the client device 109 executing the client tracking application 148. The client tracking application 148 can process the tool absence and update data associated the tool bin 106. In some embodiments, among others, the client tracking application 148 can transmit data updates to the computing environment 103. For example, the client tracking application 148 can update various tool cabinet data 124 associated with the tool cabinet 115. In one embodiment, among others, the client device 109 may be omitted and the control board 118 can be in data communications with the computing environment via the network 105.

Later, the person may return the tool item 161b to the vacant tool location 164. The one or multiple sensors associated with the vacant tool location 164 can detect the presence of the tool item 161b. Thus, the sensor network layer 121 can transmit a signal indicative of the presence of the tool item 161b to the control board 118. The control board 118 can then transmit the presence of the tool item 161b to the client device 109.

In another non-limiting example, the cut-out layer 155 may be altered or removed, but the covering layer 158 and the sensor network layer 121 may remain in the tool bin 106. In this example, the tool items 161 can be placed at different locations or different tool items 161 with different shapes may be stored in the tool bin 106. The client tracking application 148 can be used to reconfigure the sensors in the sensor network layer 121 to track the new set of tool items 161. For example, the person can operate the client device 109, via the client tracking application 148, to configure the sensor network layer 121 to detect which type of tool items 161 and at what locations in the tool bin 106. Alternatively, the client tracking application 148 can be used to group adjacent sensors in the sensor network layer 121 to detect tool items 161 that span over multiple sensor locations. In one non-limiting example, the group of adjacent sensors can be used to estimate a quantity of tool items in the group location. This estimate can be based on a collective weight measurement of the tool in the group location.

Turning to FIG. 2, shown is a drawing of a perspective cross sectional view of another cut-out layer 201 and the sensor network layer 121. In this illustrated embodiment, among others, the cut-out layer 201 has multiple tool apertures 203a, 203b (collectively "tool apertures 203") that facilitate a placement of the tool items 161 in the tool bin 106. Further, the cut-out layer 201 is positioned over the sensor network layer 121, which comprises a plurality of sensors 206a-206c (collectively "sensors 206") in a grid arrangement. Each sensor can work independently. Thus, if one sensor in the sensor network layer 121 fails, the remaining sensors can still operate. As illustrated in FIG. 2, tool item 161c is in direct contact with sensor 206c. In some embodiments, among others, a covering layer may be positioned between the cut-out layer 201 and the sensor network layer 121 as illustrated in FIG. 1B.

As one non-limiting example, a person can remove the tool item 161c from the cut-out layer 201. The sensor 206c can detect that the tool item 161c is not in contact with the surface of the sensor 206c at its respective location. Thus, the sensor network layer 121, via the sensor 206c, can transmit a signal indicative of a tool absence at the location of the sensor 206c. The transmitted signal may indicate an X axis and a Y axis coordinate location of the sensor 206c.

Subsequently, the person can return the tool item 161c to the aperture in the cut-out layer 201 above the sensor 206c. The sensor 206c can then transmit a signal indicative of the tool item 161c being present at the location of the sensor 206c. Alternatively, the person can return the tool item 161c to a different aperture such as aperture 203a or aperture 203b. In this scenario, the corresponding sensor for these apertures can then transmit a signal indicative of the tool item 161c being present at the corresponding location of the sensor 206.

Figure 3A:
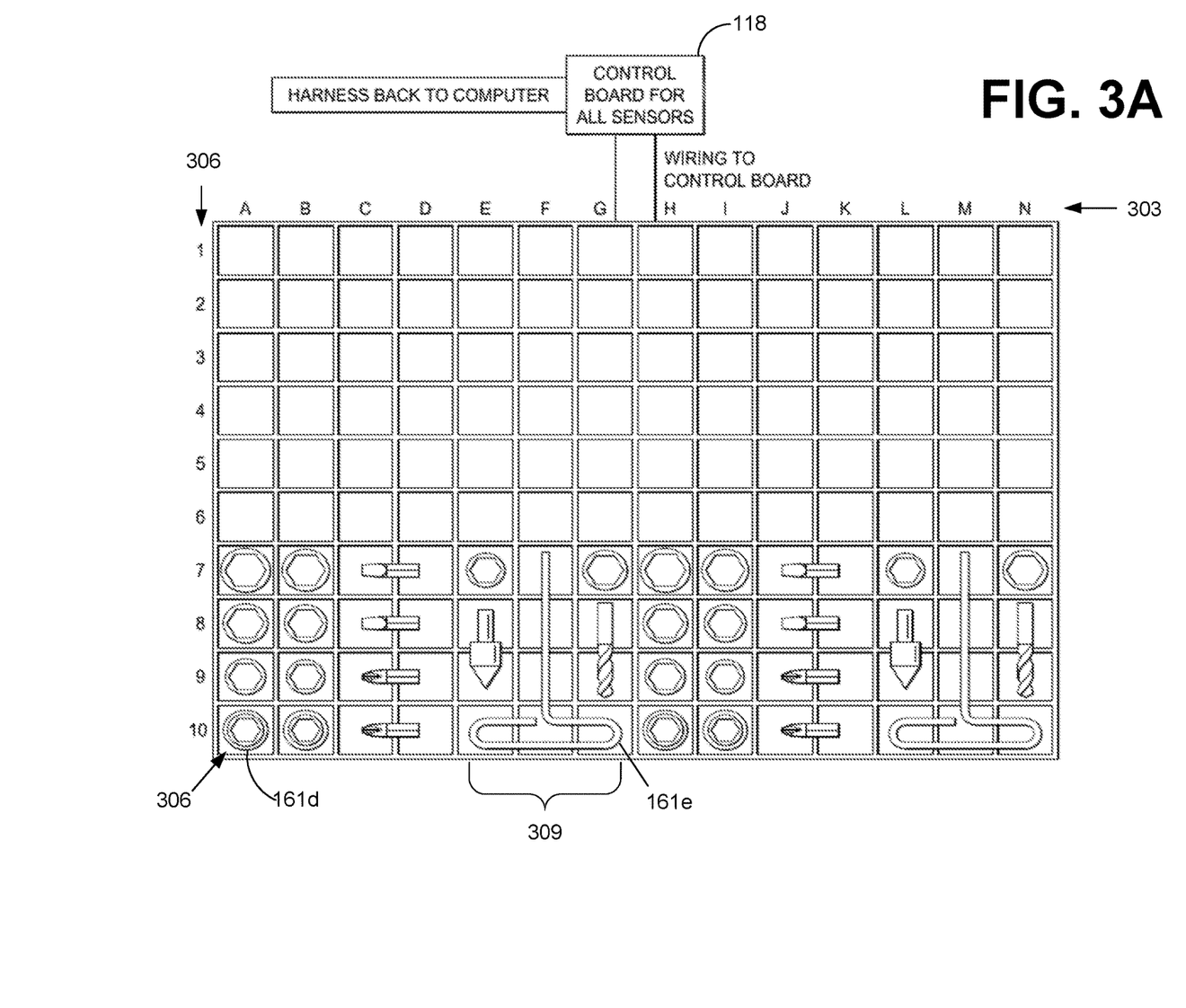
FIG. 3A is a drawing of a top view of a grid configuration of the sensor network layer and associated components according to various embodiments of the present disclosure.

Turning now to FIG. 3A, shown is drawing of a top view of a representative grid configuration of the sensor network layer 121 in communication with the control board 118. Specifically, FIG. 3A illustrates a grid coordinate system representative of one exemplary arrangement of the sensors in the sensor network layer 121. Further, FIG. 3A illustrates various tool items 161 of different shapes and sizes, such as wrench sockets, drill bits, hand tools, and other tool items. In this illustrated embodiment, reference number 303 indicates an X axis that includes letters "A" through "N," which represent different locations along the X axis. Reference number 306 indicates a Y axis that includes numbers "1" through "10," which represent different locations along the Y axis. Each X-Y coordinate location can be associated with a sensor in the sensor network layer 121, as illustrated in FIG. 2. For example, in coordinate location A-10, indicated by reference number 306, the tool item 161d (e.g. wrench socket) is present. Accordingly, the corresponding sensor associated with the coordinate location A-10 detects the tool item 161d as being present at its location. Thus, the corresponding sensor can transmit a signal indicative of the tool item 161b being present at its location.

As another non-limiting example, tool item 161e lays across multiple grid locations, as indicated by reference number 309. In this non-limiting example, the client device 109 can associate coordinate locations E10, G10, and F7-F10 to a single sensor group to correspond to the shape of the tool item 161e. Accordingly, the client device 109 can be configured to determine the presence or the absence of the tool item 161e based on signals received from all of the sensors associated with the sensor group. Therefore, if the wrench socket (e.g. tool item 161d) is placed at coordinate location F10, then the client device 109 can determine that the tool item 161e is still absent because the corresponding sensor associated with the coordinate location F10 is the only sensor that has been triggered. In some scenarios, when sensor groups are configured, the client device 109 can be configured to register the absence or the presence of the tool item based on a percentage of signals received from the sensors in the sensor group. In some embodiments, among others, the control board 118 can be configured to associate adjacent grid locations as a group and relay the presence or absence of the tool items to the client device 109.

Figure 3B:
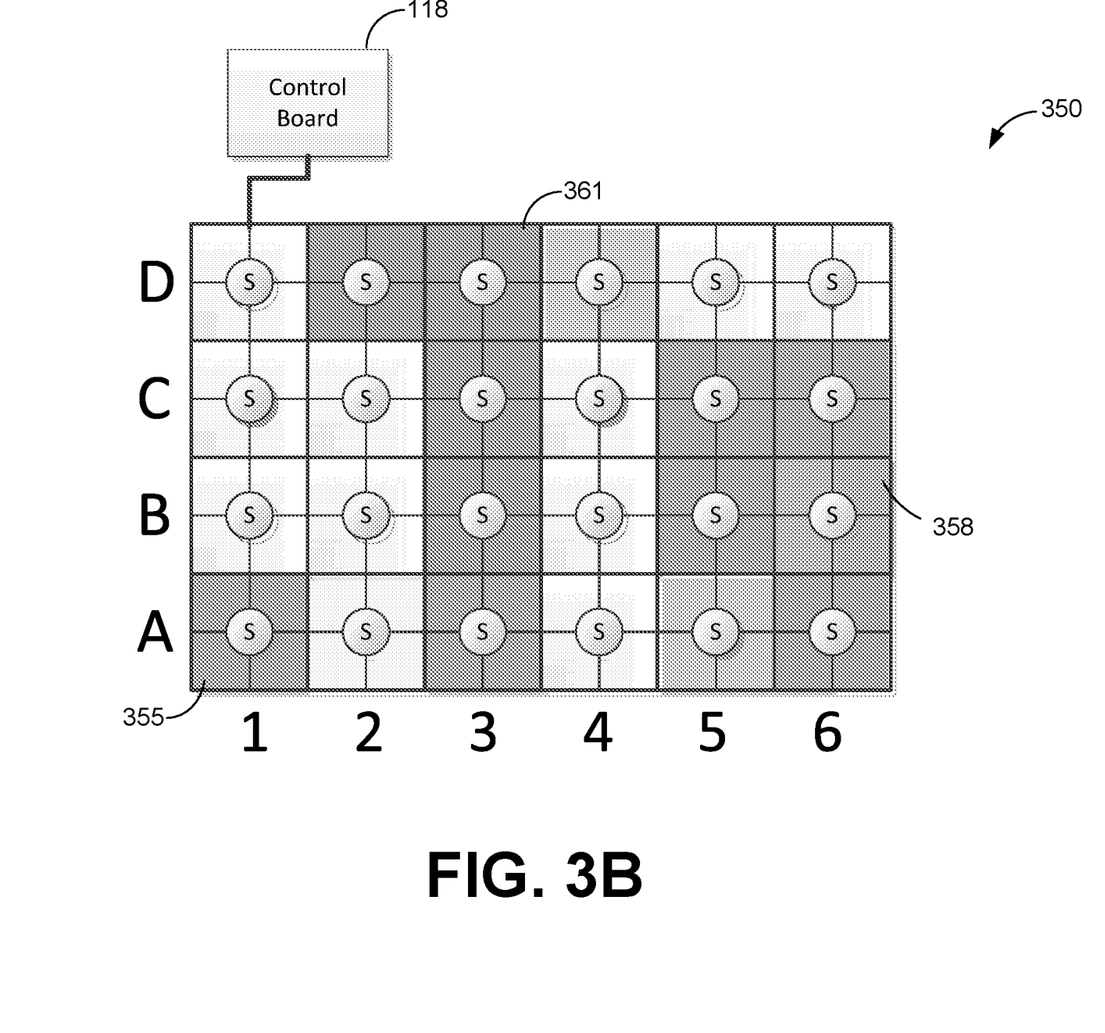
FIG. 3B is a drawing of a user interface associated with a grid configuration of the sensor network layer according to various embodiments of the present disclosure.

Turning to FIG. 3B, shown is a drawing of a user interface associated with a grid configuration of the sensor network layer 121. The illustrated sensor user interface 350 can be rendered by the client tracking application 148 on a display of the client device 109. The sensor user interface 350 includes a sensor grid representation of the sensor network layer 121. Each sensor can be represented with an "S" indicator at the corresponding location in the sensor network layer 121. The sensor user interface 350 can be an interactive display. A person can select individual sensors to configure settings associated with the corresponding sensor. For example, the sensor user interface 350 can be displayed on a touch screen display for the client device 109. The person can select on the touch screen display sensors A1-A3 and associate these sensors to a first sensor group 355. The first sensor group 355 can be grouped together to correspond to a shape of the tool item 161. Alternatively, the person can enter the grid locations of multiple sensors to a form a sensor group. As illustrated in FIG. 3B, other sensor groups can be formed with different shapes (e.g. 358 and 361). In addition, the sensor user interface 350 may be configured to troubleshoot sensors. For example, the sensor user interface 350 may indicate faculty sensors or other diagnostic information related to the sensors.

Figure 4A:
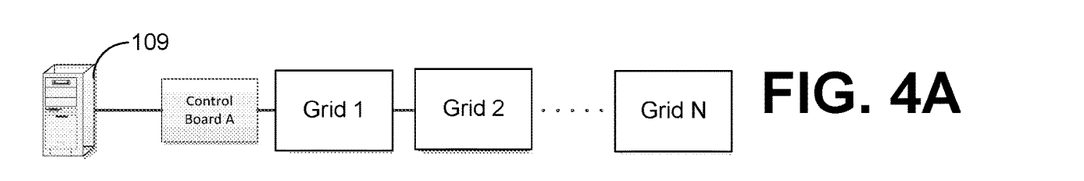
FIGS. 4A through 4D illustrate various exemplary control board and sensor grid configurations according to various embodiments of the present disclosure.

With reference to FIGS. 4A through 4D, shown are various exemplary control board and sensor grid configurations. Particularly, FIG. 4A illustrates the client device 109 coupled to control board A. Control board A, in turn, is coupled to a daisy chain of sensor grid networks. Specifically, the control board A is coupled to sensor grid network 1 and in turn, the sensor grid network 1 is coupled to sensor grid network 2. Sensor grid network 2 is coupled to sensor grid network N, etc. In this configuration, transmitted signals from the sensors in sensor grid network N can be relayed to the sensor network grid 2 and then to the sensor network grid 1. The transmitted signals ultimately can be received by the control board A.

Figure 4B:
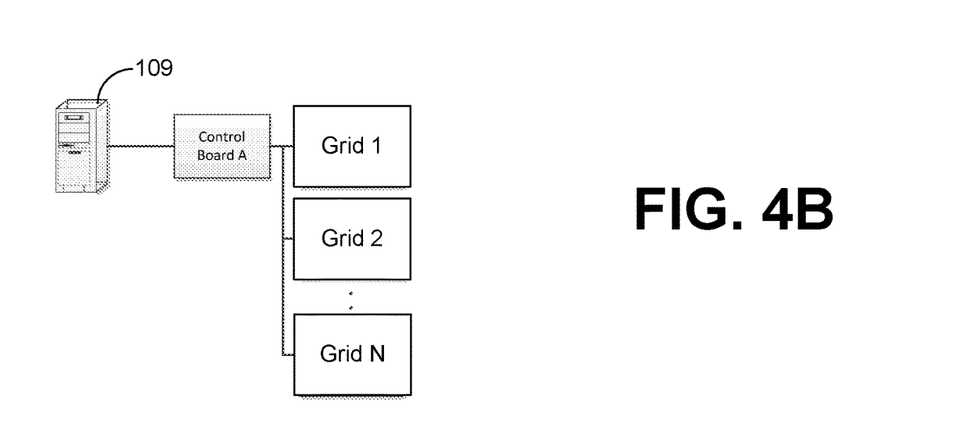

In FIG. 4B, the control board A is in data communication with the client device 109. The control board A can be coupled to sensor grid 1, sensor grid 2, sensor grid N, etc. In this configuration, the control board A can directly receive and process signals from multiple sensor grids. The control board A can then communicate the sensor data to the client device 109.

Figure 4C:
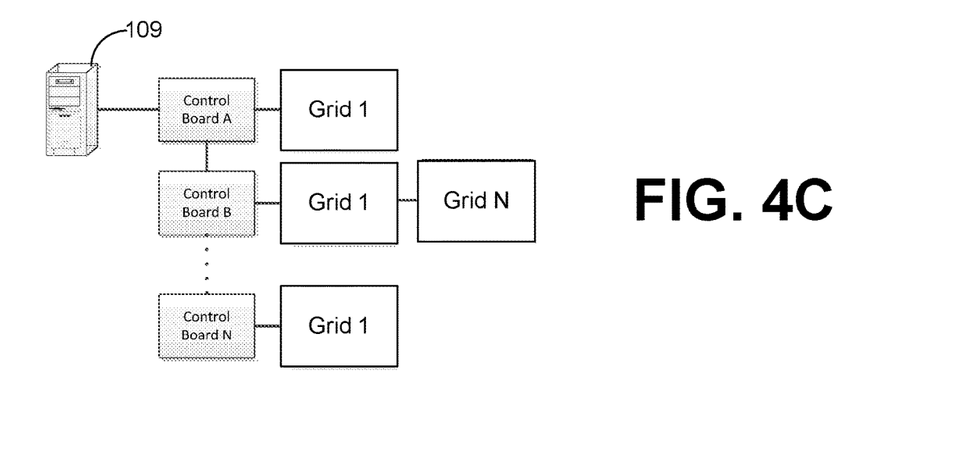

In FIG. 4C, the client device 109 can be in data communication with one control board, which can relay data to a daisy chain of sensor network grids and other control boards. As illustrated, the control board A is in data communication with the client device 109. The control board A is coupled to control board B, which is coupled to control board N, etc. Each control board can be coupled to one sensor network grid or a daisy chain of multiple sensor network grids. Accordingly, the sensor signals can be transmitted along the daisy chain of sensor network grids and also through multiple control boards. The control board A can aggregate all of the sensor signals and transmitted them to the client device 109.

Figure 4D:
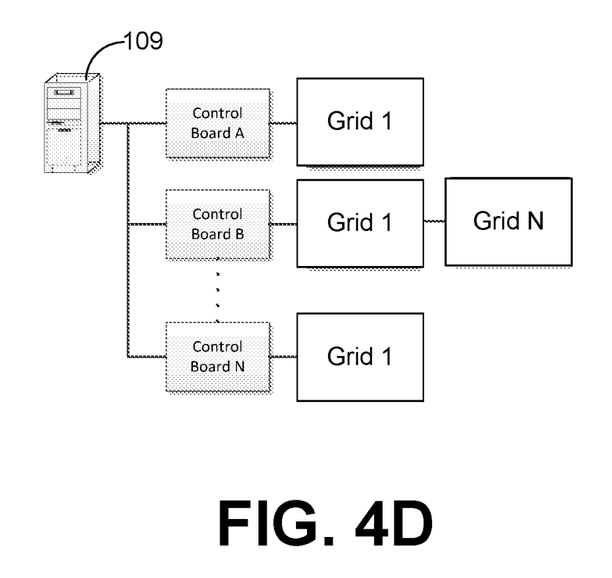

In FIG. 4D, the client device 109 can be in data communication with multiple control boards. Specifically, as shown in the illustrated embodiment, the client device 109 can be in data communications with control board A, control board B, control board N, etc. Each control board can be coupled to a daisy chain of sensor network grids. For example, control board B is coupled to sensor network grid 1, sensor network grid N, etc. In this configuration, each control board can receive and process signals from one or more sensor network grids. Each control board can then communicate the sensor data to the client device 109.

With respect to these different configurations shown in FIGS. 4A-4D, the client tracking application 148 can be used to discover the control boards 118 and sensor network grids connected to the client device 109. The client tracking application 148 can also designate individual addresses to the control boards.

Figure 5:
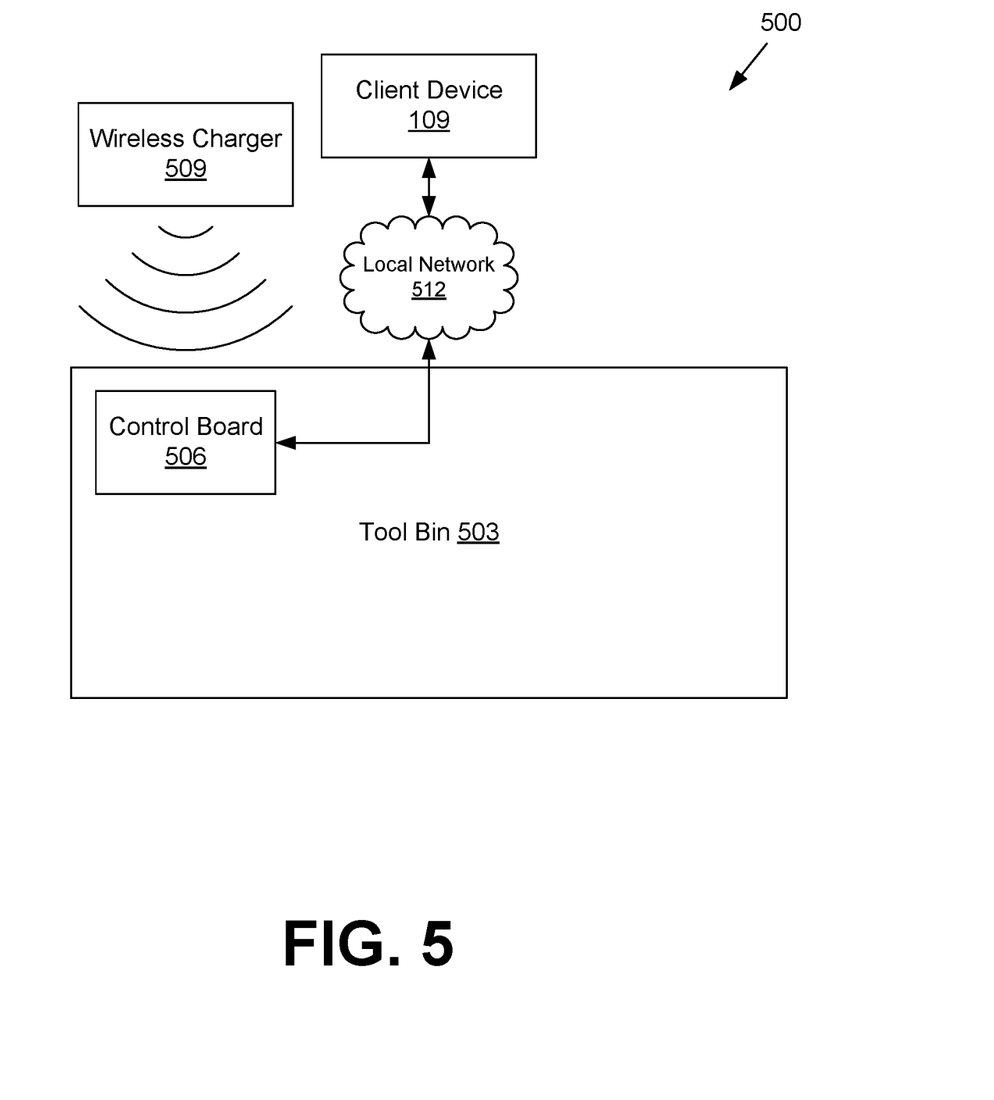
FIG. 5 is a block diagram of a wirelessly powered tool tracking bin according to various embodiments of the present disclosure.

With reference to FIG. 5, shown is a block diagram of a wirelessly powered tool bin 500. FIG. 5 illustrates an embodiment that is wirelessly powered and wirelessly communicates sensor signals to the client device 109 or alternatively, to the computing environment 103. The wirelessly powered tool bin 500 includes a tool bin 503, a control board 506, and a wireless charger 509. The control board 506 may include a battery, a wireless power receiver circuit, a processor, a communications transceiver, and other suitable electronic and mechanical components. The communications transceiver can be a wired or wireless transceivers for communicating over various protocols. For example, the communications transceiver can represent a Bluetooth transceiver, an Ethernet transceiver, a wireless LAN transceiver, a LAN transceiver, and other suitable transceivers capable of data communications according to a standard or propriety protocol. Further, the communications transceiver can be in data communication with the client device 109 either through a local network 512 or through the network 105. The local network 512 may include a Bluetooth network, Zigbee network, a propriety local area network, or other suitable local area networks. The wireless charger 509 wirelessly powers the control board 506 via the wireless power receiver circuit.

As one non-limiting example, the wirelessly powered tool bin 500 can receive power and charge its battery while being within a charging zone of the wireless charger, which may be a defined radius from the wireless charger. In these scenarios, among others, the charging zone may be while the tool bin 503 is inside of a tool cabinet. As one skilled in the art can appreciate, the radius of the charging zone can depend on the design of the wireless charger. In some embodiments, among others, the battery power constraints can be configured to different power-up and power down modes for the control board 506. As example, when the tool bin 503 is open (i.e. pulled out of the tool cabinet), the control board 506 can be disconnected from the client device 109 by stopping data communication to save battery power and at this moment a person may be picking up or returning a tool. The wireless charger 509 can start charging the control board 506 when the control board 506 enters the charging zone by closing the tool bin 503. The control board 506 can resume data communication to the client device 109. At this time, the control board 506 can update the client device 109 with tools have been return or removed from the tool bin 503.

Figure 6:
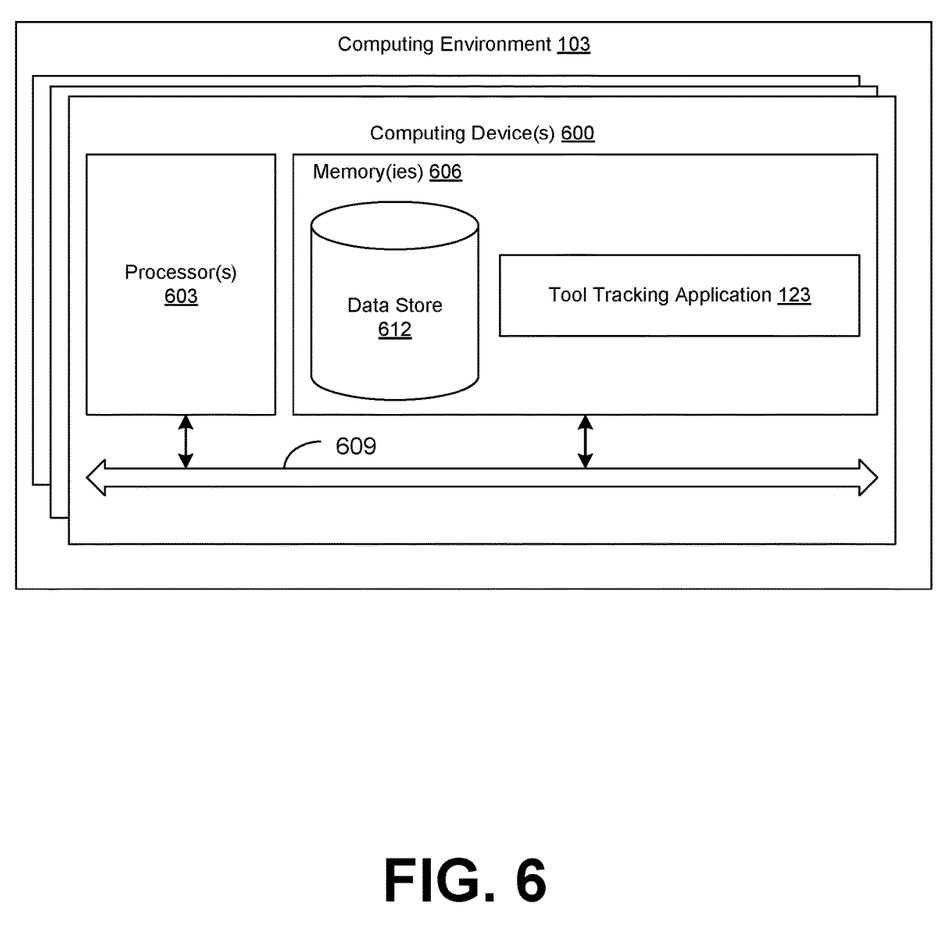
FIG. 6 is a schematic block diagram that illustrates an example computing environment employed in the networked environment of FIG. 1 according to various embodiments.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are list of main applications, and potentially other applications. Also stored in the memory 606 may be a data store 612 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although list of main applications, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the tool tracking application 123 and the client tracking application 148, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including list of main applications, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An apparatus, comprising:
a tool cabinet comprising at least one bin;
a sensor network layer positioned in the at least one bin, wherein the sensor network layer comprises a plurality of sensors for detecting a respective tool item at a tool location; and a computing device associated with the tool cabinet and coupled to the sensor network layer, the computing device being configured to:
receive a user selection of a first portion of the plurality of sensors from a user interface, the first portion of the plurality of sensors being selected to correspond to a first shape of a first tool item;
configure the first portion of the plurality of sensors to operate as a sensor group for the first shape of the first tool item based at least in part on the user selection of the first portion of the plurality of sensors, the sensor group being configured to detect a presence or an absence of the first tool item at the tool location based at least in part on the first shape of the first tool item, wherein a first inventory of the first tool item is associated with the first shape of the first tool item using the first portion of the plurality of sensors;
determine the presence of the first tool item at the tool location based at least in part on a quantity of individual sensors from the sensor group providing a sensor signal, and the quantity of the individual sensors meeting a detection threshold; and
adjust the sensor group for a second shape for a second tool item based at least in part on a second user selection of a second portion of the plurality of sensors from the user interface, wherein a second inventory of the second tool item is dynamically changed to be associated with the second shape of the second tool item using the second portion of the plurality of sensors.

2. The apparatus of claim 1, wherein the computing device is configured to associate each of the plurality of sensors with one of a plurality of respective locations in the at least one bin.

3. The apparatus of claim 2, wherein the plurality of sensors are arranged in a grid configuration.

4. The apparatus of claim 2, wherein the computing device is configured to:
assign the sensor group to a grid location in the at least one bin.

5. The apparatus of claim 1, further comprising a covering layer positioned over the sensor network layer, wherein the covering layer is configured to facilitate a placement of the first tool item at the tool location, and the covering layer comprises a flexible material, and wherein the sensor network layer is integrated within the covering layer.

6. The apparatus of claim 1, wherein the plurality of sensors comprises at least one of a metal sensor, a weight sensor, a proximity sensor, an optical sensor, or a mechanical switch.

7. The apparatus of claim 1, further comprising a communications transceiver that is in data communication with the computing device, the communications transceiver being configured to establish a data communication channel with a remote computing device.

8. The apparatus of claim 7, wherein the communications transceiver is configured for the data communication via at least one of a Bluetooth protocol, a proprietary protocol, a Wireless local area network protocol, or a wired local area network protocol.

9. A tool tracking system, comprising:
a bin;
a computing device associated with the bin;
a sensor layer positioned in the bin, the sensor layer being coupled with the computing device, wherein the sensor layer comprises a plurality of sensors for detecting a respective tool item at a tool location;
a liner layer positioned over the sensor layer, the liner layer configured to facilitate a placement of the respective tool item at the tool location; and
the computing device being configured to:
receive a user selection of a first portion of the plurality of sensors from a user interface, the first portion of the plurality of sensors being selected to correspond to a first shape of a first tool item;
configure the first portion of the plurality of sensors to operate as a sensor group for the first shape of the first tool item based at least in part on the user selection of the first portion of the plurality of sensors, the sensor group being configured to detect a presence or an absence of the first tool item based at least in part on the first shape of the first tool item being formed by the first portion of the plurality of sensors, wherein a first inventory of the first tool item is associated with the first shape of the first tool item using the first portion of the plurality of sensors;
detect the presence of the first tool item at the tool location based at least in part on a quantity of individual sensors from the sensor group providing a sensor signal, and the quantity of the individual sensors meeting a detection threshold; and
adjust the sensor group for a second shape for a second tool item based at least in part on a second user selection of a second portion of the plurality of sensors from the user interface, wherein a second inventory of the second tool item is dynamically changed to be associated with the second shape of the second tool item using the second portion of the plurality of sensors.

10. The tool tracking system of claim 9, wherein the computing device receives power from a wireless power transmitter.

11. The tool tracking system of claim 9, wherein the liner layer comprises a plurality of raised protrusions that are positioned in an arrangement to indicate the placement of the respective tool item at the tool location.

12. The tool tracking system of claim 9, wherein the plurality of sensors are in a grid arrangement, each of the plurality of sensors being associated with one of a plurality of respective locations in the bin.

13. The tool tracking system of claim 9, wherein the first tool item comprises at least one of a drill bit, a wrench socket, a ratchet, or a wrench.

14. The tool tracking system of claim 9, wherein the bin is positioned in a tool cabinet or on a shelf.

15. A system, comprising:
a tool drawer;
a covering layer positioned in the tool drawer, the covering layer configured to facilitate a placement of a tool item at a tool location; and
a sensor network layer integrated within the covering layer, wherein the sensor network layer comprises a plurality of sensors for detecting the tool item at the tool location; and
a computing device coupled to the sensor network layer, wherein the computing device being configured to:
configure a first portion of the plurality of sensors to operate as a sensor group for a first shape of a first tool item based at least in part on a first user selection of the first portion of the plurality of sensors from a user interface, wherein a first inventory of the first tool item is associated with the first shape of the first tool item using the first portion of the plurality of sensors;

determine a first placement of the first tool item on the tool location based at least in part on a quantity of individual sensors from the sensor group providing a sensor signal, and the quantity of the individual sensors meeting a detection threshold; and adjust the sensor group for a second shape for a second tool item based at least in part on a second user selection of a second portion of the plurality of sensors from the user interface, wherein a second inventory of the second tool item is dynamically changed to be associated with the second shape using the second portion of the plurality of sensors.

16. The system of claim 15, wherein the first user selection of the first portion of the plurality of sensors are positioned to correspond to the first shape of the first tool item.

17. The system of claim 15, wherein the computing device is further configured to generate a time stamp associated with a tool removal event or a tool check-in event in response to a change associated with the first placement of the first tool item at the tool location.

18. The system of claim 15, wherein the covering layer comprises a plurality of raised protrusions that form at least one recessed area that corresponds to a shape of a respective tool.

19. The system of claim 15, wherein the computing device is further configured to set a sensor sensitivity setting in the sensor network layer.

20. The system of claim 15, wherein the user interface is a touch screen interface.

* * * * *